(12) United States Patent
Hussain

(10) Patent No.: US 7,972,130 B1
(45) Date of Patent: Jul. 5, 2011

(54) METHOD AND APPARATUS FOR BLOWING PLASTIC CONTAINERS

(75) Inventor: Tasadduq Hussain, Perrysburg, OH (US)

(73) Assignee: Rexam Healthcare Packaging Inc., Perrysburg, OH (US)

( * ) Notice: Subject to any disclaimer, the term of this patent is extended or adjusted under 35 U.S.C. 154(b) by 1927 days.

(21) Appl. No.: 10/675,622

(22) Filed: Sep. 30, 2003

(51) Int. Cl.
*B29C 49/06* (2006.01)
*B29C 49/36* (2006.01)

(52) U.S. Cl. ........ 425/526; 425/533; 425/540; 264/513; 264/537; 264/237

(58) Field of Classification Search .............. 425/534, 425/535, 552, 577, 526, 537, 538; 264/237
See application file for complete search history.

(56) References Cited

U.S. PATENT DOCUMENTS

| | | | |
|---|---|---|---|
| 3,065,501 A | 11/1962 | Gasmire | |
| 3,593,597 A * | 7/1971 | Jennings | ............... 74/818 |
| 3,944,643 A | 3/1976 | Sato et al. | |
| 3,998,577 A | 12/1976 | Farrell | |
| 4,076,071 A | 2/1978 | Rosenkranz et al. | |
| 4,091,059 A | 5/1978 | Ryder | |
| 4,151,236 A | 4/1979 | Ryder | |
| 4,152,383 A * | 5/1979 | Ryder | ............... 264/39 |
| 4,201,535 A | 5/1980 | Ninneman | |
| 4,239,475 A | 12/1980 | Rainville | |
| 4,449,913 A | 5/1984 | Krishnakumar et al. | |
| 4,473,515 A | 9/1984 | Ryder | |
| 4,518,549 A | 5/1985 | Hart | |
| 4,597,268 A | 7/1986 | Andersson | |
| 4,616,077 A | 10/1986 | Silva | |
| 4,668,177 A | 5/1987 | Gatti | |
| 4,759,708 A | 7/1988 | Hestehave et al. | |
| 4,808,366 A | 2/1989 | Kaminski et al. | |
| 4,941,815 A | 7/1990 | Julian | |
| 4,955,804 A | 9/1990 | Martell et al. | |
| 5,232,715 A | 8/1993 | Fukai | |
| 5,516,470 A | 5/1996 | Larsson | |
| 5,518,392 A | 5/1996 | Tate et al. | |
| 5,599,567 A | 2/1997 | Gellert | |
| 5,679,306 A | 10/1997 | Nakajima et al. | |
| 5,817,348 A * | 10/1998 | Ikeda | ............... 425/529 |
| 6,171,541 B1 | 1/2001 | Neter et al. | |
| 6,221,305 B1 | 4/2001 | Lopez | |

* cited by examiner

*Primary Examiner* — Monica A Huson
(74) *Attorney, Agent, or Firm* — Reising Ethington PC

(57) ABSTRACT

An injection blow molding machine (10) having a core rod (18) against which a parison of a thermoplastic material is formed by injection molding. The core rod is cooled by causing a stream of compressed and conditioned air from an inlet manifold (52) to flow through the core rod. The core rod has an outer annular tube (70) surrounding an inner annular tube (74) and defining an annulus (80) therewith, and the annulus (80) is divided into inlet and outlet flow passages (82, 84) by opposed projections (76, 78) that extend thereinto. Spent cooling air from the core rod is exhausted to an outlet manifold (54) from which it is discharged to atmosphere through a line (42) or recompressed by a compressor (46) and returned to the inlet manifold (52) after reconditioning. The conditioned air has a regulated pressure as a result of passing through a pressure regulator (24), and is heated, if needed, by passing it through a heater (26), or cooled, if needed, by injecting a water spray from a spray nozzle (36) thereinto.

6 Claims, 5 Drawing Sheets

METHOD AND APPARATUS FOR BLOWING PLASTIC CONTAINERS

BACKGROUND OF THE INVENTION

1. Field of the Invention

This invention relates to a method and apparatus for blow molding plastic articles. More particularly, this invention relates to a method and apparatus for blow molding plastic containers by an injection blow molding process.

2. Description of the Prior Art

As is shown, for example, in U.S. Pat. No. 4,239,475 (Rainville), and in U.S. Pat. No. 4,518,549 (Hart), it is known that articles, such as containers, may be manufactured from a suitable thermoplastic material by an injection blow molding process. In such a process, a turret having a plurality of planar, vertically extending faces, usually three (3) such faces, carries a spaced apart plurality of parallel, horizontally extending core rods on each of its faces. The turret is indexed in a horizontal plane about its vertical central axis through a plurality of stations equal in number to the number of faces, with a stop at each station. A preform of the article to be produced, which is usually called a parison, is produced by injection molding on the core rods at the first station, and each such parison is later blown into a container at the second station, after the turret is indexed to advance the parisons to the second station, the blowing being done by injecting compressed air into the parisons at the second station to blow them into contact with blow molds at the second station. The blown containers are then stripped from the core rods at the third station, after the turret is indexed to advance the blown containers to the third station.

It is important that the blown containers be substantially cooled before they are stripped from the core rods at the stripping station. Conventionally, this is done mainly by circulating heated oil through the interiors of the core rods at the injection molding station, the heated oil being at a temperature substantially less than the temperature of the thermoplastic material in the injection molded parisons, for example, at a temperature sufficiently low to bring low density polyethylene parisons at a temperature of approximately 450° F. to a temperature of approximately 200° F. before the parisons are advanced to the blow molding station. However, the use of heated oil as a cooling medium involves a risk that the containers being produced will be contaminated by oil leakage from the core rods; further, the need to initially heat unheated oil, and the need to further cool core rods that are internally heated by the oil passing therethrough, imposes undesired additional cooling loads on the process occurring at the bottle blowing station. Also, the thermal capacitance of hot oil, or any other cooling liquid for that matter, precludes rapid changes in its temperature, even when and if desired for process reasons.

It is to the elimination of the disadvantages of using heated oil or other liquid cooling medium to cool injection molded parisons of articles, especially parisons of containers, which are being manufactured by an injection blow molding machine, that the present invention is directed to.

Accordingly, it is an object of the present invention to provide an improved method and in apparatus for producing articles, especially containers, from a thermoplastic material by an injection blow molding process. It is a further object of the present invention to provide a method and apparatus of the aforesaid character for producing such articles without the need to use a heated oil, or any other cooling liquid, as a cooling medium to cool the articles being produced by injection blow molding.

For a further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 1:
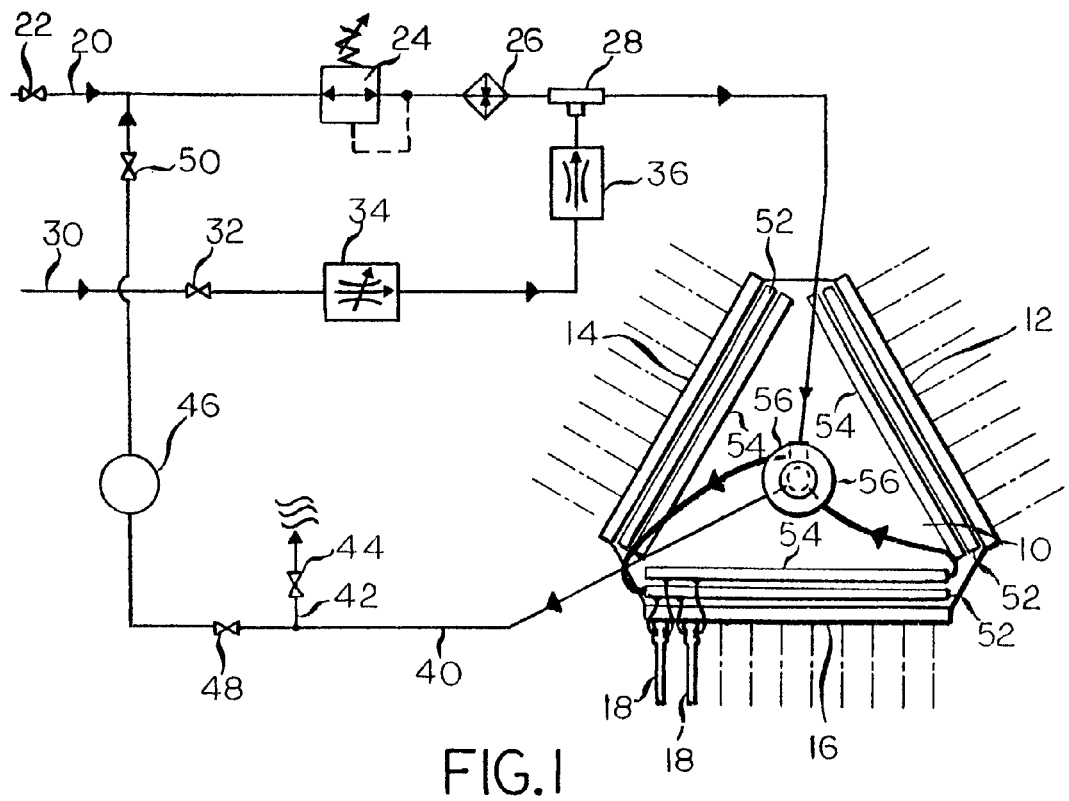
FIG. 1 is a diagrammatic plan view of an apparatus according to the preferred embodiment present invention for practicing a process according to the preferred embodiment of the present invention.
Figure 2:
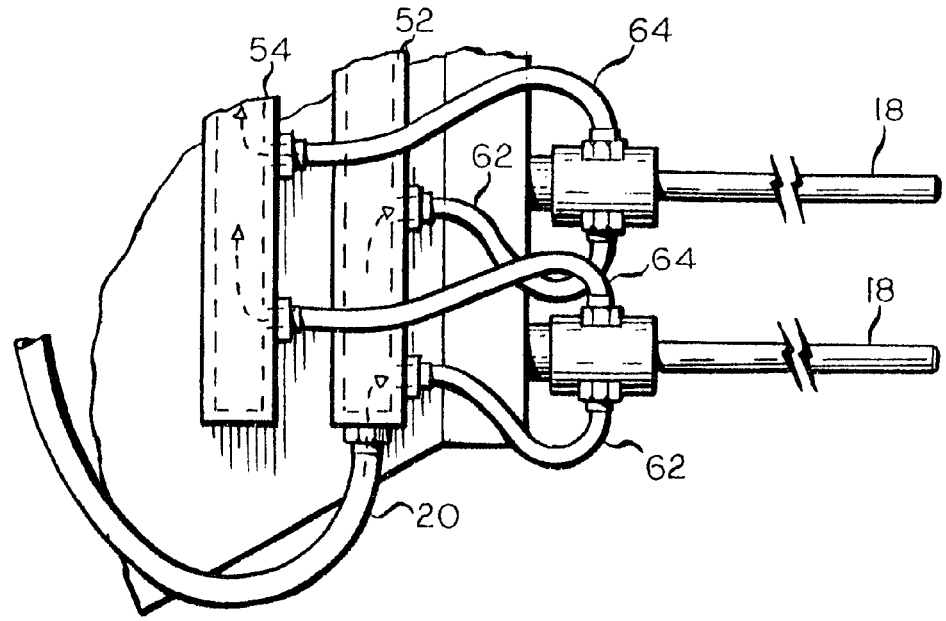
FIG. 2 is a fragmentary plan view, at an enlarged scale, of a portion of the apparatus of FIG. 1.

FIG. 1 illustrates a generally triangularly shaped turret 10 that is caused to index in a horizontal plane in steps of 120° in a known manner. The turret 10 has vertically extending, planar faces 12, 14, 16, and the indexing motion of the turret 10, in the illustrated embodiment, is counterclockwise. Each of the planar faces 12, 14, 16 is provided with a spaced apart plurality of parallel, horizontally extending core rods 18, only the centerlines of which are shown, other than for two of the core rods 18 that extend from the planar face 16. In the position of the turret 10 as shown, the planar face 14 is at a position where parisons are formed by injection molding from a suitable thermoplastic material about the core rods 18 that extend from the planar face 14, containers are then blown from the injection molded parisons about the core rods extending from the planar face 16, and blown containers are stripped from the core rods extending from the planar face 12. Each indexing motion or the turret 10 will, of course, be effective to advance the planar faces 12, 14, 16, with the core rods 18 extending therefrom, to the next station that is 120° removed from the prior station, to facilitate the manufacturer of blown plastic containers in a nearly continuous manner. Apparatus of the type illustrated is suitable for the manufacture of thermoplastic containers from a variety of thermoplastic materials, including materials made up primarily of polyethylenes either low density or high density, or polypropylene.

The thermoplastic material being injection molded on the core rods 18 at the injection molding station is at an elevated temperature, e.g., approximately 450° F. for low density polyethylene. However, the temperature must be substantially lowered, e.g., from approximately 450° F. to approximately 200° F., before the injection molded parisons are at a suitable temperature for blowing into containers at the blow molding station. Thus, substantial cooling of the injection molded parisons must occur, and it preferably should occur before indexing the injection molded parisons to the blow molding station.

In the present invention, internal cooling of the core rods 18 at the injection molding station is accomplished by circulating suitably conditioned, compressed air through the interiors of the core rods 18. Compressed air is provided to the turret 10 through a line 20 from a suitable source (not shown), a shutoff valve 22 being provided in the inlet line 20 to isolate the turret 10 from the source of compressed air whenever desired. The pressure of the compressed air in the inlet line 20 is regulated by passing the compressed air through a pressure regulator 24 of conventional construction in the line 20, and the compressed air is then heated, if needed, by passing it through a heater 26 of conventional construction in the line 20. Alternatively, if and when desired, the compressed air in the line 20 may be cooled by injecting a spray of water thereinto at a cooler 28 of conventional construction in the line 20. In that regard, water from a water inlet line 30, which may be tap water, is delivered to the cooler 28, when permitted by a shutoff valve 32, after passing through a flow control valve 34 of conventional construction in the line 30, and then through a spray nozzle 36 of conventional construction in the line 30. Spent conditioned air from the turret 10 is then exhausted through an outlet line 40, either to be vented to atmosphere by way of a branch line 42, through which flow is permitted or blocked by a shutoff valve 44, or is returned to the inlet line 20 after passing through a compressor 46 of conventional construction, shutoff valves 48, 50 being provided upstream and downstream of the compressor 46, respectively, to isolate it from flow of spent cooling air therethrough whenever desired.

The turret 10 is provided, at each of its faces 12, 14, 16, with a cooling air inlet manifold 52 and a cooling air outlet manifold 54. Cooling air flows to the inlet manifold at the injection blow molding station through a rotary union 56 that rotates with the turret 10 beneath a fixed cam plate 58, which carries a suspended cam 60. The cam 60 engages a limit switch 62 at the parison blow station occupied by the planar face 16 in the orientation depicted in FIG. 1 to block conditioned air from flowing into the cooling air inlet manifold 52 by blocking the exhaust of spent conditioned air from such station. Cooling air then flows into the core rods 18 at such station through inlet lines 62, and, after passage through the core rods 18, to the cooling air outlet manifold 54 through outlet lines 64.

Figure 3:
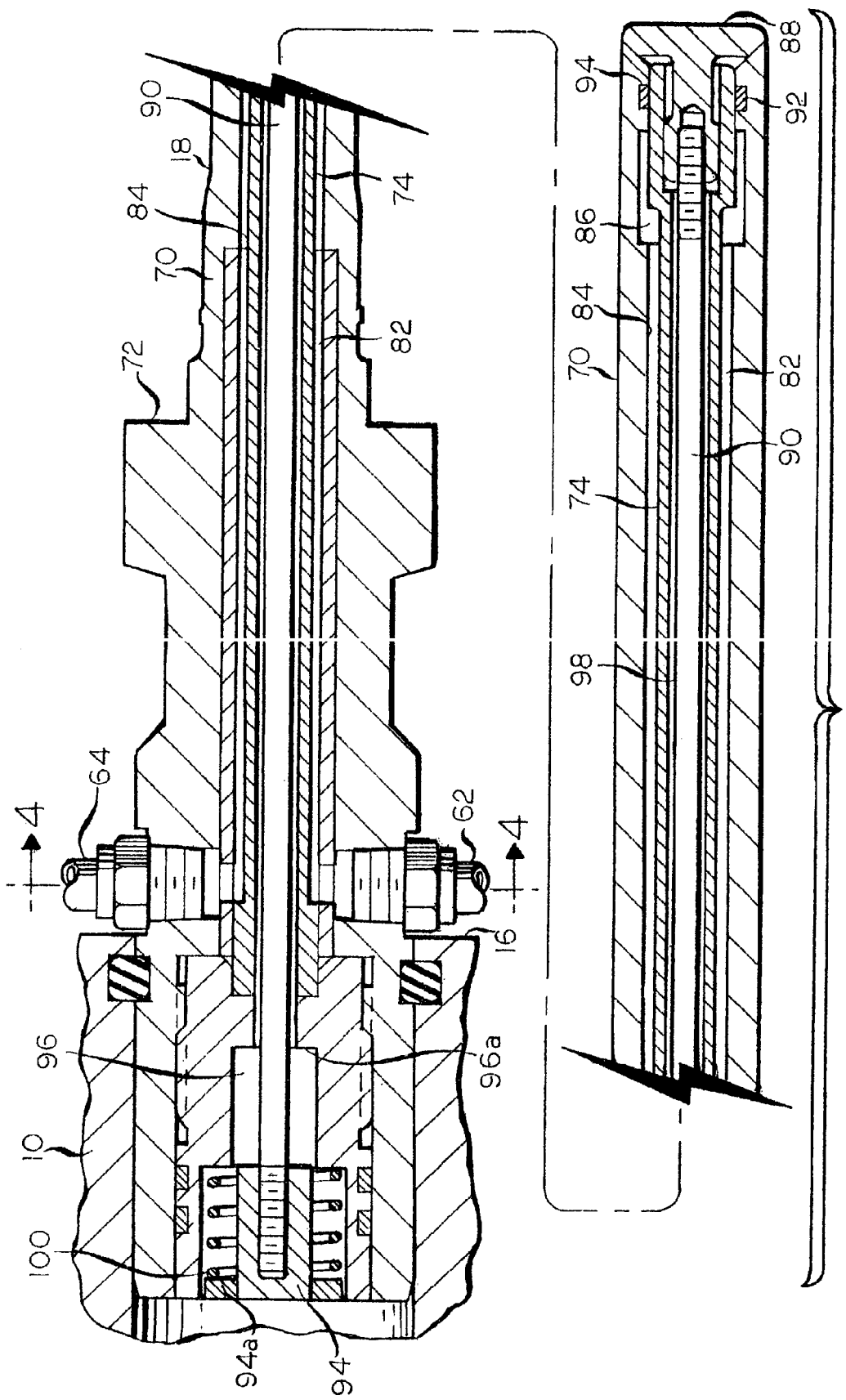
FIG. 3 is a plan view, mainly in cross-section and at an enlarged scale, of an element of the apparatus of FIGS. 1 and 2.
Figure 4:
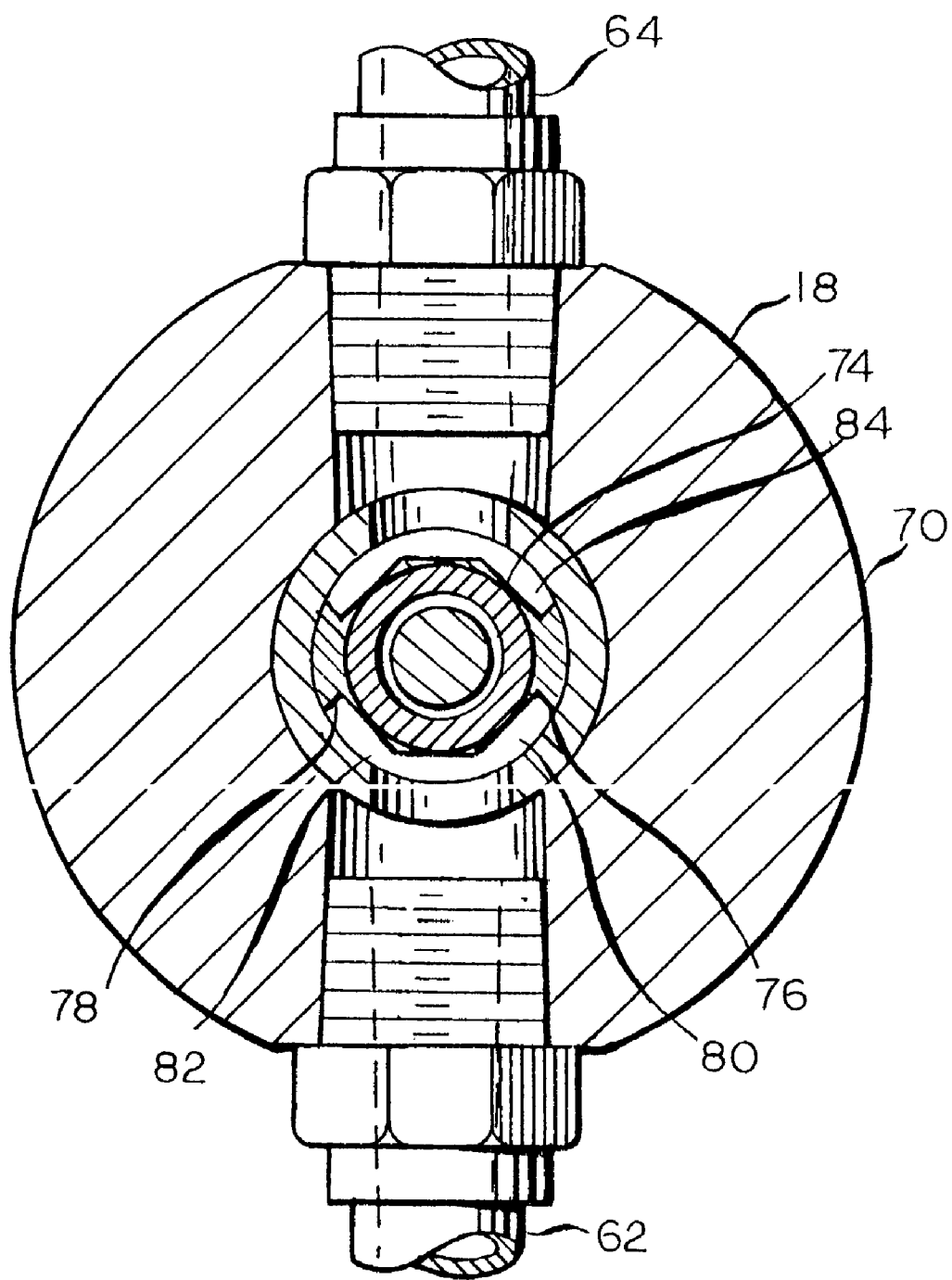
FIG. 4 is a sectional view taken on line 4-4 of FIG. 3.
Figure 5:
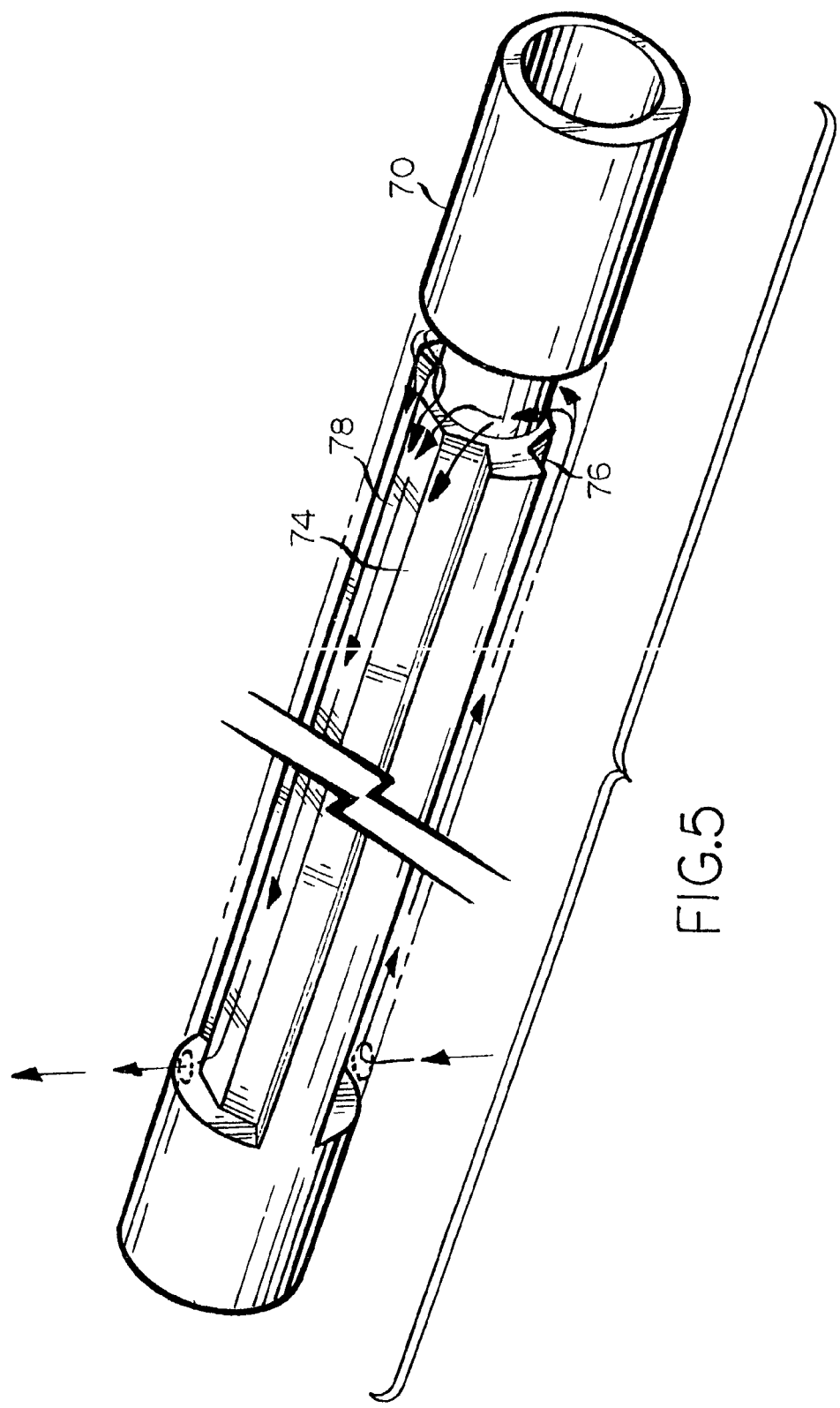
FIG. 5 is a perspective view of a portion of the apparatus of FIGS. 1-4.
Figure 6:
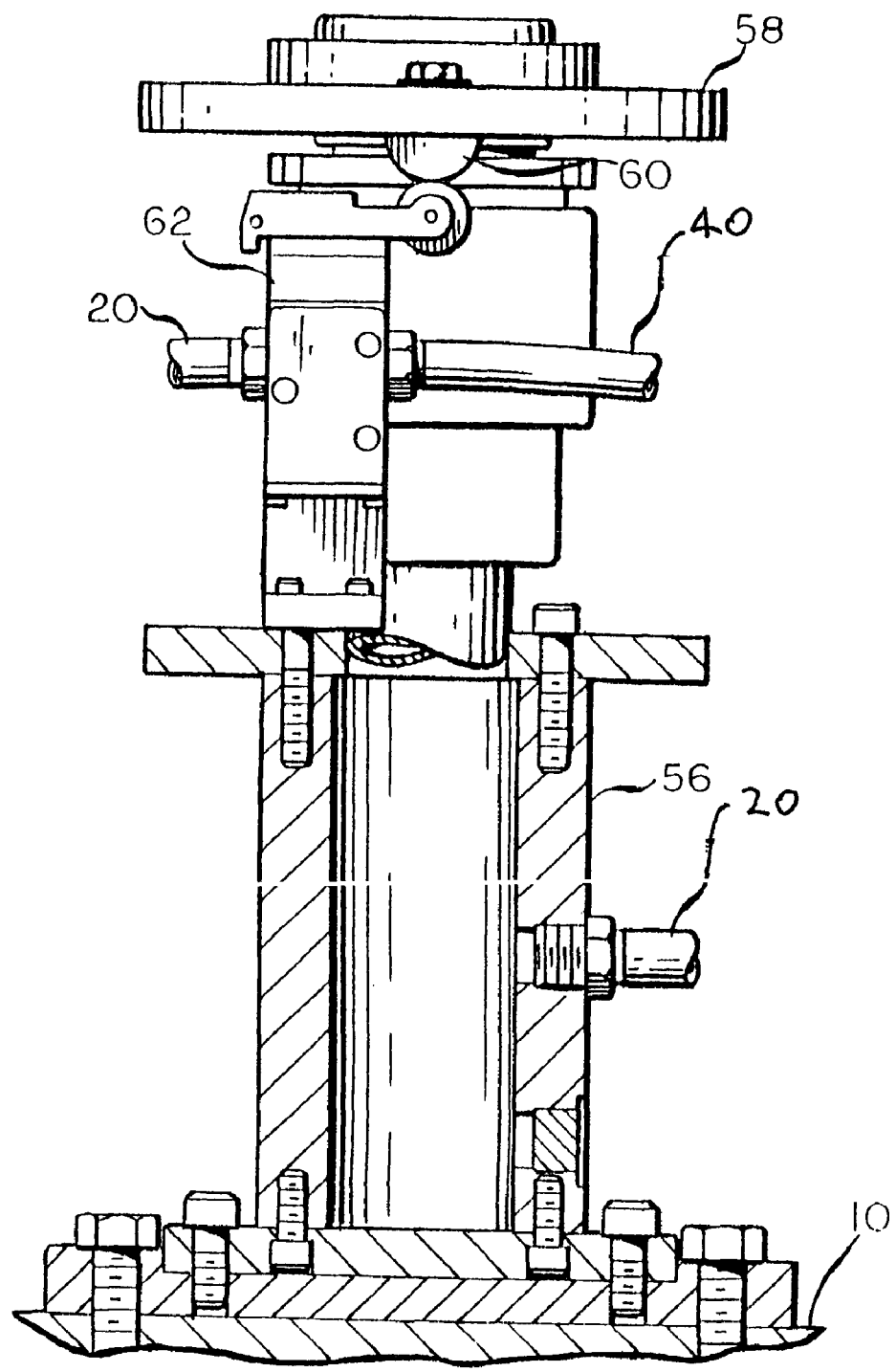
FIG. 6 is an elevation view, partly in cross-section and at an enlarged scale, of a portion of the apparatus of FIG. 1.

As is shown in FIGS. 3-5, each core rod 18 has an outer annular member 70 with a transversely extending annular face 72. The outer annular member 70 circumscribes an inner annular member 74, which extends for nearly the entire length of the outer annular member 70 (FIG. 6), and the inner annular member 74 is provided with opposed, laterally extending projections 76, 78, which extend for most of the length of the inner annular member 74 and separate an annulus 80 defined between the outer annular member 70 and the inner annular member 74 into oppositely extending flow passages 82, 84. Thus, cooling air flows into and through the air flow passage 82 from the inlet line 62, until it reaches an annular recess 86 within the outer annular member 70, the annular recess 86 being positioned beyond the free ends of the projections 76, 78. From the annular recess 86, the cooling air flows into and through the flow passage 84, to be exhausted through the outlet line 64. A free end of the outer annular member 70 is closed, except during the blowing step at the planar face 16, by a transversely extending end closure member 88, which is engaged by a threaded free end of a rod 90 that extends through the interior of the inner annular member 74. Sealing of a juncture between the outer annular member 70 and the inner annular member 74 is accomplished by inserting an elastomeric ring 92 in an inwardly facing recess 94 in the outer annular member 70, at a location near a free end of the outer annular member 70, to sealingly engage an outer surface of the inner annular member 74.

At the blowing station, blow air from a separate supply is introduced into the parisons on the core rods 18 by moving the rods 90 and the end closure members 88 that are attached thereto away from the position illustrated in FIG. 3.

Tins is done by driving a member 94, to which an opposed free end of the rod 90 is threadably secured, inwardly into a recess 96 of the outer annular member 70, and this is done by a spring-biased cam drive element (not shown) at the blowing station. The member 94 is provided with a flange portion 94a, and is caused to return to its FIG. 3 position by the action of a coil spring 100 that is trapped between the flange and an annular shoulder 96a at the end of the recess 96. Reciprocation of the rod 90 in this manner will allow blow air in the recess 96 from a source (not shown) to flow through the core rod in an annulus 98 between the rod 90 and the inner annular member 94 to pass from the free end of the core rod 18 when the rod is pressed inwardly against the action of the spring 100. Other techniques for introducing blow air into parisons on a core rod are known in the art but are not fluffier described herein because that is not a feature of the core rod cooling system of the present invention.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. An injection blow molding machine having a turret with at least three planar faces, each of the planar faces carrying at least one hollow core rod, the turret being rotatable by an indexing motion to present each face, successively, at a plurality of stations to form, at one of said stations, a preform of an article on said at least one core rod at said one of said stations, and then to form, at a successive one of said stations, a blown article from said preform on said at least one core rod, and apparatus for cooling said at least one core rod at said one of said stations, said apparatus comprising:

a source of compressed air;
means for conditioning compressed air from said source;
means for circulating conditioned compressed air from said means for conditioning compressed air through said at least one core rod at said one of said stations;
means for blocking circulation of compressed air from said means for conditioning compressed air through said at least one core rod at the successive one of said stations;
said means for circulating compressed air comprising means for exhausting compressed air from said at least one core rod at said one of said stations, and
means for compressing compressed air exhausted from said at least one core rod and returning said compressed air exhausted from said at least one core rod to said means for circulating compressed air for conditioning by said means for conditioning to return said compressed air exhausted from said at least one core rod to said at least one core rod,
wherein said means for blocking circulation of compressed air blocks the circulation of compressed air by blocking the exhaust of spent conditioned air from the successive one of said stations.

2. An injection blow molding machine having a turret with at least three planar faces, each of the planar faces carrying at least one hollow core rod, the turret being rotatable by an indexing motion to present each face, successively, at a plurality of stations to form, at one of said stations, a preform of an article on said at least one core rod at said one of said stations, and then to form, at a successive one of said stations, a blown article from said preform on said at least one core rod, and apparatus for cooling said at least one core rod at said one of said stations, said apparatus comprising:

a source of compressed air;

means for conditioning compressed air from said source;

means for circulating conditioned compressed air from said means for conditioning compressed air through said at least one core rod at said one of said stations; and means for blocking circulation of compressed air from said means for conditioning compressed air through said at least one core rod at the successive one of said stations, said means for circulating compressed air comprising means for exhausting compressed air from said at least one core rod at said one of said stations, and wherein said means for blocking circulation of compressed air blocks the circulation of compressed air by blocking the exhaust of spent conditioned air from the successive one of said stations.

3. Apparatus according to claim 2 wherein said means for conditioning comprises pressure regulating means for regulating pressure of said compressed air.

4. Apparatus according to claim 2 wherein said means for conditioning comprises heater means for heating said compressed air.

5. Apparatus according to claim 2 wherein said means for conditioning comprises cooler means for cooling said compressed air.

6. Apparatus according to claim 5 wherein said cooler means comprises means for injecting a spray of water into said compressed air.

* * * * *